United States Patent
Romanov et al.

(10) Patent No.: US 7,653,721 B1
(45) Date of Patent: Jan. 26, 2010

(54) MECHANISM FOR CAPTURING HIGH LEVEL EVENTS ON USER INTERFACE COMPONENTS

(75) Inventors: Mikhail Romanov, San Jose, CA (US); Dmitri Chiriaev, Campbell, CA (US); Alexey Yarmolenko, Saint-Petersburg (RU)

(73) Assignee: Sun Microsystems, Inc., Santa Clara, CA (US)

( * ) Notice: Subject to any disclaimer, the term of this patent is extended or adjusted under 35 U.S.C. 154(b) by 1153 days.

(21) Appl. No.: 10/983,324

(22) Filed: Oct. 29, 2004

(51) Int. Cl.
*G06F 15/173* (2006.01)
*G06F 3/00* (2006.01)
*G06F 9/44* (2006.01)

(52) U.S. Cl. .................. 709/224; 719/310; 719/318; 717/125

(58) Field of Classification Search .............. None
See application file for complete search history.

(56) References Cited

U.S. PATENT DOCUMENTS

| | | | |
|---|---|---|---|
| 5,157,779 A | 10/1992 | Washburn et al. | |
| 5,214,780 A | 5/1993 | Ingoglia et al. | |
| 5,321,838 A * | 6/1994 | Hensley et al. | 717/125 |
| 5,333,302 A | 7/1994 | Hensley et al. | |
| 5,428,618 A | 6/1995 | Ueki et al. | |
| 5,642,490 A | 6/1997 | Morgan et al. | |
| 5,758,062 A | 5/1998 | McMahon et al. | |
| 5,883,639 A * | 3/1999 | Walton et al. | 345/473 |
| 6,184,880 B1 | 2/2001 | Okada | |
| 6,189,047 B1 | 2/2001 | Ball | |
| 6,336,149 B1 | 1/2002 | Preston | |
| 6,380,924 B1 | 4/2002 | Yee et al. | |
| 6,532,023 B1 | 3/2003 | Schumacher et al. | |
| 6,662,226 B1 | 12/2003 | Wang et al. | |
| 6,968,509 B1 | 11/2005 | Chang et al. | |
| 7,036,079 B2 | 4/2006 | McGlinchey et al. | |
| 7,398,530 B1 * | 7/2008 | Parla et al. | 719/318 |
| 2003/0009602 A1* | 1/2003 | Jacobs et al. | 709/318 |
| 2004/0111488 A1* | 6/2004 | Allan | 709/217 |
| 2005/0033713 A1 | 2/2005 | Bala et al. | |
| 2005/0060719 A1* | 3/2005 | Gray et al. | 719/318 |
| 2005/0091576 A1* | 4/2005 | Relyea et al. | 715/502 |

(Continued)

OTHER PUBLICATIONS

U.S. Appl. No. 10/976,469, filed Oct. 29, 2004.

(Continued)

*Primary Examiner*—Wen-Tai Lin
(74) *Attorney, Agent, or Firm*—Osha Liang LLP

(57) ABSTRACT

A recording mechanism is disclosed for automatically capturing high level events on user interface (UI) components of a set of software. In one implementation, the recording mechanism registers with a UI component to receive notification when an event occurs on the UI component. When an event does occur, the recording mechanism receives notification thereof from the UI component. In one implementation, the notification includes some high level event-specific information. After the notification is received, the recording mechanism creates and stores a record of the event, which includes at least a portion of the event-specific information, as well as information indicating the UI component as the target of the event. The record may further include information indicating a component hierarchy in which the UI component is contained. Overall, the record contains all of the information needed to reproduce the event on the UI component of the software at a later time.

23 Claims, 9 Drawing Sheets

U.S. PATENT DOCUMENTS

2005/0183143 A1    8/2005    Anderholm et al.

OTHER PUBLICATIONS

U.S. Appl. No. 10/986,524, filed Nov. 10, 2004.

U.S. Appl. No. 10/976,469, filed Oct. 29, 2004, Office Action Mailing Date Apr. 20, 2007.

SpyCapture, "SpyCapture 1.4.5", SpyCapture, Version 1.4.5, Publisher's Description, retrieved from website <http://spycapture.tsm-soft-enterprise.qarchive.org/>, released on Aug. 27, 2004, 1 page.

* cited by examiner

702 ⟶ <RECORD>
  704 ⟶ <ACTION>
    706(1) ⟶ <COMP TYPE = COMPONENT TYPE OF CONTAINER 402
                TITLE = TITLE OF CONTAINER 402
                INDEX = INDEX OF CONTAINER 402
                TARGET = 0 />
    706(2) ⟶ <COMP TYPE = COMPONENT TYPE OF CONTAINER 404
                TITLE = TITLE OF CONTAINER 404
                INDEX = INDEX OF CONTAINER 404
                TARGET = 0 />
    706(3) ⟶ <COMP TYPE = COMPONENT TYPE OF CONTAINER 406
                TITLE = TITLE OF CONTAINER 406
                INDEX = INDEX OF CONTAINER 406
                TARGET = 0 />
    706(4) ⟶ <COMP TYPE = COMPONENT TYPE OF BUTTON 408
                TITLE = TITLE OF BUTTON 408
                INDEX = INDEX OF BUTTON 408
                TARGET = 1 />
    708 ⟶ <EVENT ID = BUTTON PUSHED/>
  704 ⟶ </ACTION>

•
      •
      •

702 ⟶ </RECORD>

*Fig. 7*

MECHANISM FOR CAPTURING HIGH LEVEL EVENTS ON USER INTERFACE COMPONENTS

BACKGROUND

Complex computer software is typically developed incrementally. That is, as functionality is added, and as bugs are detected and fixed, different "builds" of the software are created. With each build (which represents an intermediate version of the software), the software is tested, enhanced, and refined. Through a series of builds, the software is incrementally improved until a final, fully operational version of the software is derived. For a highly complex set of software, there can be hundreds or even thousands of builds before the final version of the software is derived.

As noted above, each build is tested to ensure that it is working properly. This usually involves the running of a series of tests on each build. Even if a test passes on one build, that test is still run on subsequent builds to make sure that whatever was done in the most recent build has not broken any functionality that was working properly in previous builds. As a result, in many cases, the same tests are run over and over again on different builds.

The testing of builds is often done manually. That is, a build is often tested by having a user execute the software on a computer, and then having the user select certain functionality through a series of user interface actions (e.g. mouse clicks, keyboard actions, etc.) on certain user interface components (e.g. buttons, menus, etc.). The user then observes the results of the selections to determine whether the software operated properly. Testing a build manually is fine if the number of builds is relatively small. However, as noted above, there can be hundreds or even thousands of builds for a complex set of software. Having a user manually test this many builds is slow, tedious, costly, and generally wasteful.

To reduce the amount of manual effort required, some testers have written testing programs. A testing program basically takes the place of the user by programmatically initiating the user interface actions (e.g. keystrokes, mouse clicks, etc.) on the software that the user otherwise would have had to initiate manually. With a testing program, the amount of user involvement can be significantly reduced. However, the testing program approach has some significant drawbacks. One drawback is that it requires a user with sufficient programming skills to write the program. Many testers do not have such skill. Another drawback is that it requires the tester to have intimate knowledge of the internals of the software to be tested. Often, the tester is not the person who developed the software, and hence, does not have such familiarity with the software. Furthermore, the testing program may have to be changed to accommodate changes in the software, which means that the testing program may have to be constantly updated. In some cases, the amount of time and effort required to write and to update the testing program may be almost as great as testing the various builds manually. In view of these shortcomings, an improved methodology is needed.

SUMMARY

In accordance with one embodiment of the present invention, there is provided a recording mechanism for automatically capturing high level events on user interface (UI) components of a set of software. With such a recording mechanism, it is possible for a user to easily and conveniently specify how a set of software is to be manipulated and/or tested. To do so, the user simply executes the set of software on a computer system, and initiates certain low level UI actions (e.g. mouse clicks, keyboard actions, etc.) on certain UI components of that software. Basically, the user acts in the same manner as if he/she were manually manipulating/testing the software. While the user is doing this, the recording mechanism records the user's actions. In one embodiment, the recording mechanism records not the low level UI actions but rather the high level abstractions or meanings of the actions. For example, the recording mechanism does not record that a left mouse click occurred on a button. Instead, it records the meaning of the action (e.g. that the button was pushed or released). By doing so, the recording mechanism captures the essence of what the user is doing to test/manipulate the software rather than the low level UI actions used to achieve the testing/manipulation.

In one embodiment, the recording mechanism records high level events (actions) on a UI component by registering with the UI component to receive notification when an event occurs on the UI component. When an event does occur, the recording mechanism receives notification thereof from the UI component. In one embodiment, the notification includes some high level event-specific information. For example, if the UI component is a button, the notification may specify whether the button was pushed or released. If the UI component is a toggle (e.g. a radio button), the notification may specify whether the toggle was selected or deselected. After the notification is received, the recording mechanism creates and stores a record of the event. The record includes at least a portion of the event-specific information, as well as information indicating the UI component as the target of the event. In one embodiment, as part of creating the record, the recording mechanism determines a component hierarchy in which the UI component is contained (e.g. the UI component may reside inside a UI container, which resides within another UI container, and so on, giving rise to a hierarchy), and includes information indicating this component hierarchy in the record. Overall, the record contains all of the information needed to reproduce the event on the UI component of the software at a later time.

In the manner discussed above, the recording mechanism may register itself with a plurality of UI components of the software, receive notifications of events from those UI components, and create and store records of those events. In effect, the event records chronicle the users actions on the various UI components of the software. In this manner, by using the recording mechanism, the user is able to easily and conveniently specify how the software is to be tested/manipulated.

After the event records are created and stored, a number of things can be done. For example, the event records may be formatted into a structured, self-describing format, such as XML (extensible markup language), to give rise to a formatted version of the records. Then, the formatted version may be used to automatically generate a set of test computer code. When executed at a later time in conjunction with the software or another build of the software, this test computer code causes the recorded high level events to be applied to the proper UI components of the software. In effect, the test computer code takes the place of the user and does what the user would have had to do manually to test the software. In this manner, the software or another build of the software is tested automatically, and this automatic testing is achieved without the drawbacks of the prior art. Namely, the user does not have to write any computer code, and the user does not need to be familiar with the internals of the software. As a result, automatic testing of software is achieved easily and efficiently.

BRIEF DESCRIPTION OF THE DRAWINGS

FIG. 7 shows some sample XML which captures a UI event in accordance with one embodiment of the present invention.

DETAILED DESCRIPTION OF EMBODIMENT(S)

Overview

Figure 1:
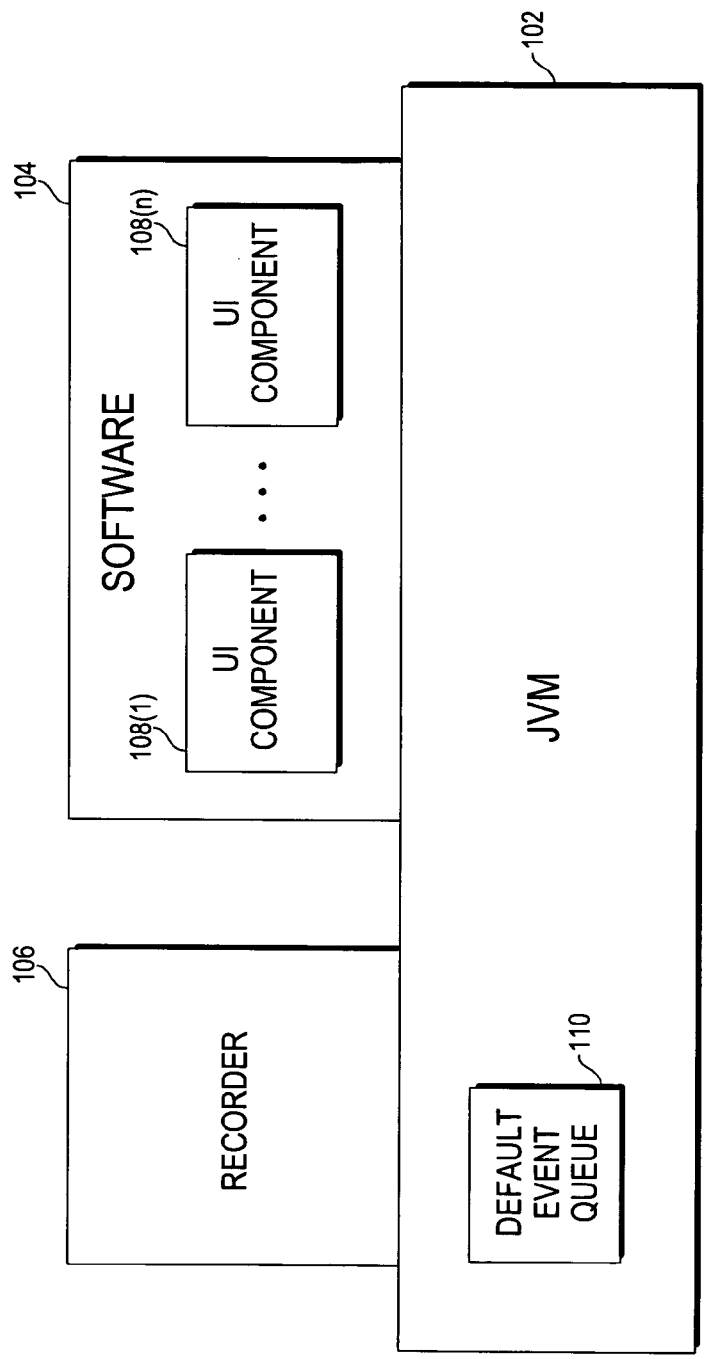
FIG. 1 is a functional block diagram of an environment in which one embodiment of the present invention may be implemented.

With reference to FIG. 1, there is shown a functional block diagram of a sample environment in which one embodiment of the present invention may be implemented. In the sample shown, the environment is Java-based. It should be noted though that this is for illustrative purposes only. If so desired, the embodiment may be implemented in any other type of environment.

As shown in FIG. 1, the environment comprises a Java virtual machine (JVM) 102, a set of subject software 104, and a recorder 106. In one embodiment, JVM 102, software 104, and recorder 106 are implemented as sets of computer instructions executed on a computer system, such as the sample computer system of FIG. 9. Alternatively, the functionality of JVM 102 and recorder 106 may be implemented using hardwired logic (e.g. ASIC's). These and other implementations are within the scope of the present invention.

Java Virtual Machine (JVM)

JVM 102 provides the underlying platform for supporting and managing the execution of the software 104 and recorder 106. In one embodiment, the software 104 and recorder 106 are executed in different threads of the same JVM 102. In providing the underlying platform, the JVM 102 provides all of the underlying, low-level functionalities relied upon by the software 104 and recorder 106. These functionalities include, but certainly are not limited to, the detection and dispatching of low-level UI actions. More specifically, JVM 102 monitors for actions from user interface devices such as keyboards and cursor control devices (which may include but are not limited to a mouse, a trackball, a touchpad, a pointing stick, a touch screen, etc.). When such an action is detected, JVM 102 passes the action to the default event queue 110 (which is a part of the JVM 102). In turn, the default event queue 110 determines which UI component should receive the action, and then dispatches the action to that UI component for processing. Thus, JVM 102 acts as the intermediary between the UI devices and the UI components.

Software

The software 104 represents the software 104 that is to be manipulated/tested. In addition to other components that provide desired functionality, the software 104 comprises a plurality of UI components 108. As used herein, the term UI component refers broadly to any component that appears on a user interface and that can be selected or invoked by a user via a user interface device (e.g. keyboard, cursor control device, etc.). There are generally two broad categories of UI components: (1) UI control components; and (2) UI container components. A UI control component is a component that contains no other UI components. A UI control component may be, for example, a button that when selected causes a certain functionality to be invoked. A UI control component may also be, for example, a radio button that can be toggled to select or deselect an item. Since a UI control component does not contain any other UI component, it can be analogized to a leaf node on a tree.

A UI container component is a component that contains one or more other UI components. A UI container component may contain one or more UI control components, one or more other UI container components, or both. For example, a container component may be a tab that, when selected, displays some information along with one or more buttons that can be selected. A UI container component is generally invoked or opened to get to other UI containers or to UI control components. A UI container component may be analogized to a non-leaf node of a tree.

Because UI components can contain other UI components, a hierarchy of UI components can result. This means that in order to get to a particular UI control component, it may be necessary to traverse one or more UI container components. For example, if a UI control component is contained within a first UI container component which in turn is contained within a second UI container component, then to get to the UI control component, it will be necessary to open the second UI container component, and then the first UI container component. Thus, to enable a UI control component to be accessed, it may be necessary to specify the component hierarchy in which that UI control component is contained.

Recorder

Using one or more UI devices (e.g. keyboard, cursor control device, etc.), a user can manipulate/test the software 104. More specifically, using one or more UI devices, the user can issue low level UI actions (e.g. keyboard actions, mouse clicks, etc.) to select/invoke certain UI components 108 of the software 104. While the user is manipulating/testing the software 104 in this way, the recorder 106 (if activated) can be recording the user's actions to enable them to be reapplied to the software 104 at a later time. In one embodiment, the recorder 106 does not record the user's low level UI actions but rather the high level events that result from the UI actions. For example, the recorder 106 does not record that a left mouse click occurred on a UI button. Instead, it records that the UI button was pushed (the high level event or result of doing a left mouse click on the UI button). By recording high level events in this way, the recorder 106 chronicles the high level actions of the user, and allows a user to easily specify what UI components he/she wishes to manipulate/test in the software 104.

Figure 2:
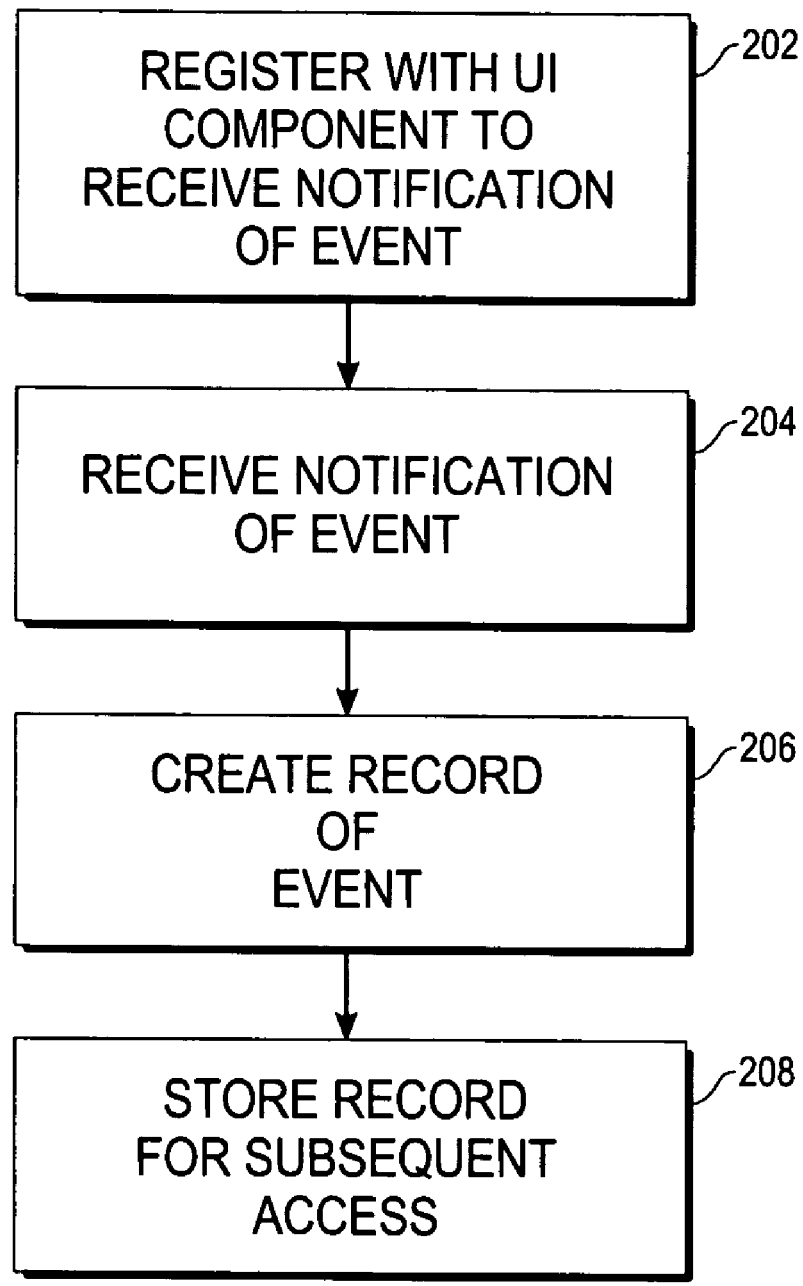
FIG. 2 is a flow diagram showing how a high level event may be recorded in accordance with one embodiment of the present invention.

In one embodiment, the recorder 106 records a high level event occurring on a UI component 108 in the manner shown in FIG. 2. Initially, the recorder 106 registers (block 202) with the UI component 108 to receive notification when an event (a high level event) occurs on the UI component 108. This may be done, for example, by registering a callback function with the UI component 108. When the UI component 108 experiences an event, it invokes the callback function to notify the recorder 106 of the event. In one embodiment, this notification includes some event-specific information (e.g. if the UI component 108 is a radio button, the event-specific information may include an indication of whether the radio button was selected or deselected).

The notification is received (block 204) by the recorder 106, and in response, the recorder 106 creates (block 206) a record of the event. In one embodiment, the record comprises at least a portion of the event-specific information, as well as information indicating the UI component 108 as the target of the event. In one embodiment, as part of creating the record, the recorder 108 determines a component hierarchy, if any, in which the UI component 108 is contained (e.g. the UI component may reside inside a UI container, which resides within another UI container, and so on, giving rise to a hierarchy). In addition, the recorder 106 obtains component-specific information for the UI component 108 and for each of the UI container components in the hierarchy. All of this component-specific information is include in the record of the event. Overall, the record contains all of the information needed to reproduce the event on the UI component 108 of the software 104 at a later time.

After the record is created, it is stored (block 208) for subsequent access. The record may be stored in volatile or persistent storage, and it may be stored in any manner that enables it to be subsequently accessed (e.g. in a file, in a database, or any other accessible data structure).

In the manner described above, the recorder 106 may register itself with one or more UI components 108 of the software 104. Thus registered, it can receive notifications of events from those UI components 108, and can create and store records of those events. In one embodiment, the recorder 106 registers itself with all of the UI components 108 of the software 104; thus, the recorder 106 is notified of and is able to record all of the high level events on all of the UI components 108. Because of this, by activating the recorder 106, a user can easily and conveniently specify and record how he/she wishes the software 104 to be tested/manipulated.

After the high level events are recorded, a number of things can be done. For example, the event records may be formatted into a structured, self-describing format, such as XML (extensible markup language), to give rise to a formatted version of the records. Then, the formatted version may be used to automatically generate a set of test computer code. When executed at a later time in conjunction with the software 104 or another build of the software, this test computer code causes the recorded events to be applied to the proper target UI components of the software 104. As an alternative to generating test computer code, the formatted version of the records may be interpreted at a later time by an interpreter (e.g. an XML interpreter). Upon interpreting the formatted version of the records, the interpreter causes the recorded events to be applied to the appropriate target UI components of the software 104. Either way, the software 104 or another build of the software can be tested automatically. These post-recording operations will be discussed in greater detail in a later section.

Thus far, this embodiment of the present invention has been discussed in the context of testing software. It should be noted though that it may also be used in other contexts, such as creating automated software demos (where use of the software is demonstrated without the user manually manipulating the UI of the software). These and other applications are within the scope of the present invention.

Sample Implementation

Figure 3:
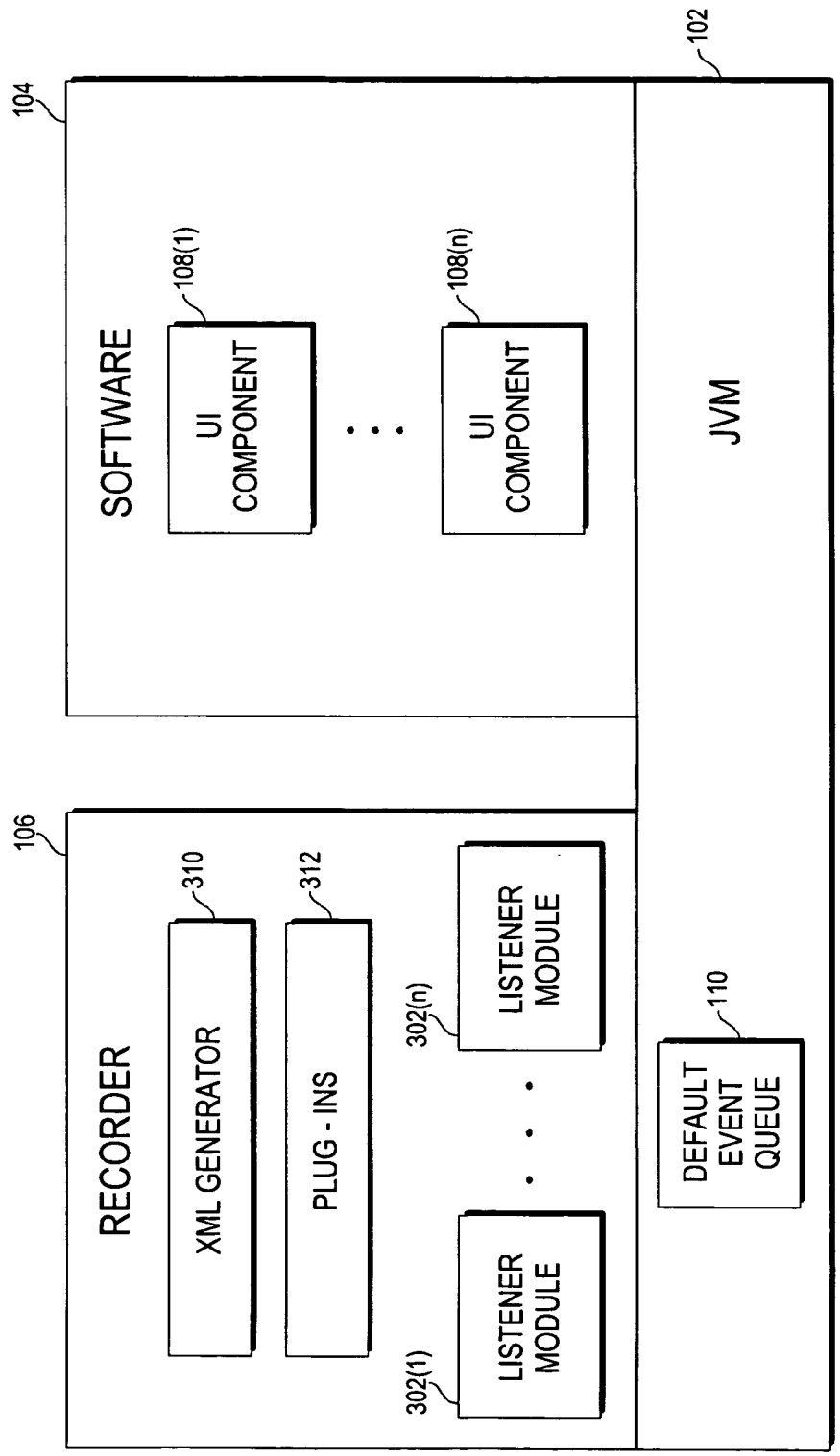
FIG. 3 is a more detailed version of the functional block diagram of FIG. 1, showing some of the components that make up a recorder, in accordance with one embodiment of the present invention.

With reference to FIG. 3, a sample implementation of the recorder 106 will now be described in greater detail. As shown in FIG. 3, the recorder 106 comprises a plurality of listener modules 302, a set of plug-ins 304, and an XML (extensible markup language) generator 306.

Listener Modules and Plug-Ins

As noted previously, in order to receive notification of an event from a UI component 108, the recorder 106 registers itself with the UI component 108. In one embodiment, the recorder 106 registers with a UI component 108 by starting up one or more listener modules 302 (also referred to herein as listeners) and registering the listener(s) with the UI component 108. In one embodiment, a listener 302 is registered with a UI component 108 by registering a callback function with the UI component 108. When the UI component 108 experiences a certain type of event associated with the callback function, the UI component 108 invokes the callback function of the listener 302 to notify the listener 302 of the event. Once notified of an event, the listener 302 creates and stores a record of the event. The event is thus captured. In one embodiment, one or more listeners 302 may be registered with each of the UI components 108 of the software 104. Thus, events on each of the UI components 108 may be captured. In one embodiment, all of the listeners 302 store the event records in a centralized data structure (e.g. a common file, a common database, etc.) to facilitate easy access to the records. If so desired, however, the event records may be stored in a distributed fashion. Together, the event records represent a chronicle of the user's interaction with the software 104.

In one embodiment, there is a plurality of types of listeners 302. Depending upon the type of a UI component 108, different types of listeners 302 may be registered therewith. The following sets forth some example associations between UI component types and listener types. It should be noted though that other associations may be implemented within the scope of the present invention, if so desired.

| UI Component Type | Listener Type(s) |
| --- | --- |
| Button (can be pushed or released) | Action Produced Listener (receives notification when the button is pushed or released) |
| Toggle (can be selected or deselected) | Selection Change Listener (receives notification when the toggle is selected or deselected) |
| Tree | Selection Change Listener (receives notification when a node on the tree is selected) |
| | Expansion Listener (receives notification when a node on the tree is expanded or contracted) |
| | Editor Listener (receives notification when a node on the tree is edited) |
| Text Field | Text Changed Listener (receives notification when text in the text field is inserted or edited) |
| Menu/List | Item Selection Listener (receives notification when an item on the menu/list is selected) |

The recorder 106 uses the above associations to determine which listeners 302 to register with which UI components 108. For example, if the recorder 106 determines that a UI component 108 is of type "button", then it will start up a listener 302 of type "action produced listener" and register that listener 302 with the UI component 108. Similarly, if the recorder 106 determines that a UI component 108 is of type "toggle" (for example, the UI component is a radio button), then the recorder 106 will start up a listener 302 of type "selection changed listener" and register that listener 302 with the UI component 108. Notice that a UI component 108 (for example, of type "tree") may have multiple listeners 302 registered therewith.

After a listener 302 is registered to receive notification of certain events on a UI component 108, it will be notified by the UI component 108 when such events occur. In response to such notification, the listener 302 creates a record of each event, and stores the record for subsequent access. In one embodiment, this record creation and storage is done by all of the above listeners 302, regardless of type. In one embodiment, several operations are performed in creating an event record. One operation is to determine a component hierarchy, if any, in which the UI component is contained. Recall from previous discussion that a UI component may be a container or a UI control, and that a UI component may be contained within one or more other UI containers. For example, a button may be contained within a UI container, which in turn is contained within another UI container, which in turn is contained within another UI container. In order to specifically identify, access, and invoke the button at a later time, the full path or hierarchy to the button is needed. For this reason, a listener 302 determines the component hierarchy in which the UI component 108 is contained. In one embodiment, the component hierarchy is determined by starting with the UI component 108, and determining all ancestor UI container components that contain, and hence are ancestors of, the UI component 108. A potential method for carrying out this operation will be described in a later section.

In addition to determining the component hierarchy, a listener 302, in one embodiment, also obtains component-specific information for the UI component 108 and for each of the UI containers in the component hierarchy. This component-specific information includes but is not limited to the type of the component, the title or name of the component, and the index associated with the component. In one embodiment, the listener 302 obtains the component-specific information by invoking one or more of the plug-ins 312. More specifically, in one embodiment, there may be a plug-in 312 associated with each type of UI component. When the listener 302 needs to obtain information on a particular UI component, it determines the type of the UI component, and invokes the plug-in 312 associated with that component type. The plug-in 312 then interacts with the UI component to extract specific information therefrom, and provides the extracted information to the listener 302. Extracting information from a UI component using a plug-in eliminates the need for the listener 302 to know how to interact with each and every type of UI component. Thus, the logic for the listener 302 can be kept general. The use of plug-ins 312 also allows customized UI components to be used in the software 104 without having to change the logic of the core components of the recorder 106.

After determining the component hierarchy and obtaining component-specific information for each of the components in the component hierarchy, the listener 302 assembles the information to create a record of the event. In one embodiment, the record contains all of the information needed to reapply the event to the UI component 108 at a later time. This information may include, but certainly is not limited to, information specific to the event (e.g. that a button was pushed, that a toggle was selected, etc.), component-specific information for the target UI component 108 (i.e. the UI component 108 with which the listener 302 is registered), component-specific information for each of the UI containers in the component hierarchy, information indicating the hierarchical relationship between the various components, information indicating that the target UI component 108 is the target of the event, etc.

After the record is created, it is stored by the listener 302 into a data structure (e.g. file, database, etc.) that can be subsequently accessed. In one embodiment, the listener 302 may store the record in any desired format. As noted above, all of the listeners 302 may store the event records in a centralized data structure (e.g. a common file, a common database, etc.) to facilitate easy access. Together, all of the event records stored by all of the listeners 302 represent a chronicle of the user's interaction with the software 104.

Component Change Listener

Thus far, the listeners 302 have been discussed mainly in the context of UI control components (e.g. buttons, toggles, etc.). These are the control components that usually give rise to recordable events. However, the software 104 may also have a plurality of UI components that are UI containers. For such components, the recorder 106 provides a "component change listener" type. In one embodiment, a component change listener is started and registered with each UI container of the software 104. A function of the component change listener is to dynamically track and adjust to any changes to a UI container. For example, if a component change listener is registered with a UI container (call it container X), then each time another UI container is opened within container X, the component change listener is notified. Likewise, each time another UI container within container X is closed, the component change listener is notified. In response to these notifications, the component change listener can take certain actions to keep the listener registrations current.

To illustrate how a component change listener works, reference will be made to an example. Suppose that software 104 has a UI container X currently open. Upon becoming aware of container X, recorder 106 starts a component change listener 302 (call it listener X), and registers it with container X. Thereafter, whenever a UI container is opened or closed within container X, listener X will be notified.

Now suppose that a user interacting with the software 104 causes a UI container (call it container Y) to be opened within container X. Container X notifies listener X of this, and in response, listener X causes another component change listener (call it listener Y) to be started, and causes that listener Y to be registered with container Y. Thereafter, listener Y will be notified by container Y whenever any UI container is opened or closed within container Y. In addition, listener X checks container Y to determine whether any UI control components are contained within container Y. For the sake of example, it will be supposed that container Y contains UI control component Z. In such a case, listener X determines the type of component Z, and determines which listener type should be registered with that type of component. Listener X will then start one or more listeners (assume one listener called listener Z), and register that listener Z with the UI control component Z. The listener Z will thereafter record events that occur on control component Z.

Suppose now that the user causes container Y to be closed. When this happens, the listener X is notified by container X. In response, listener X shuts down the listener Y registered with container Y and the listener Z registered with control component Z. In this manner, a component change listener enables the recorder 106 to dynamically adapt to the opening and closing of UI containers in the software 104.

XML Generator

In the above manner, a plurality of event records may be stored by the listeners 302 of the recorder 106. At some point, the user may wish to have these event records reformatted into a structured, self-describing format, such as XML (extensible markup language), for example. To do so, the user invokes the XML generator 310, which takes the event records stored by the listeners 302 of the recorder 106 and formats them into an XML document. The XML document can then be used for various purposes. For example, the XML document may be used to generate computer code that, when executed in conjunction with the software 104, causes the recorded events to be applied to the proper target UI components 108 of the software 104. The XML document may also be interpreted by an XML interpreter to cause the recorded events to be applied to the proper target UI components 108 of the software 104. These possible uses will be discussed further in a later section.

Sample Operation

To facilitate a complete understanding of the invention, a sample operation will now be described. In the following description, reference will be made to FIGS. 3-6.

In one embodiment, a user gives rise to the environment shown in FIG. 3 by initiating execution of the recorder 106. Executing the recorder 106 causes the JVM 102 to also be executed (since the recorder in this example is a Java-based program). The recorder 106 then causes the software 104 to be executed. In one embodiment, the recorder 106 and software 104 execute in different threads of the same JVM 102. Once all of the components 102, 104, 106 are executing, the user can start interacting with the recorder 106 and the software 104 by way of UI devices (not shown) such as a keyboard and a cursor control device (e.g. a mouse). Thus, the user can use the UI devices to select and invoke various UI components 108 of the software 104, as well as control the functionality of the recorder 106 (e.g. activate and deactivate the recording function of the recorder, instruct the recorder to format event records into XML format, etc.). In one embodiment, the user can activate and deactivate the recording function of the recorder 106 at any time. Thus, the user may record all or just some of his/her manipulating/testing of the software 104.

At some point, the user activates the recording function of the recorder 106. When that happens, the recorder 106 determines which UI components 108 are currently running in the software 104, and registers the appropriate listeners 302 with those UI components 108.

Figure 4:
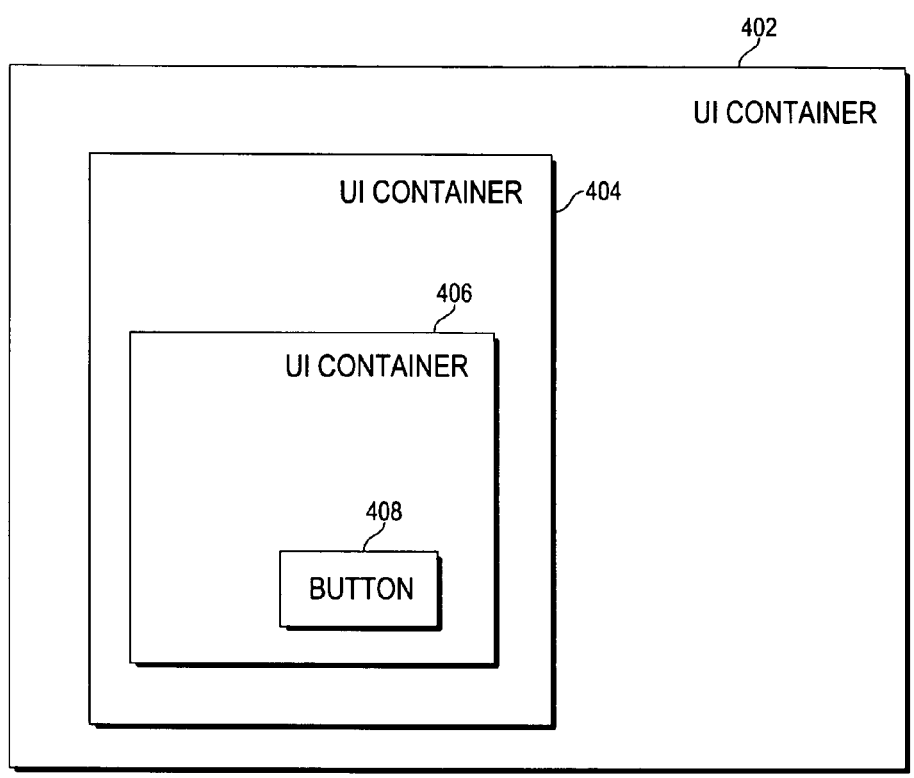
FIG. 4 shows an example of a UI in which a button is contained within several layers of UI containers.
Figure 5:
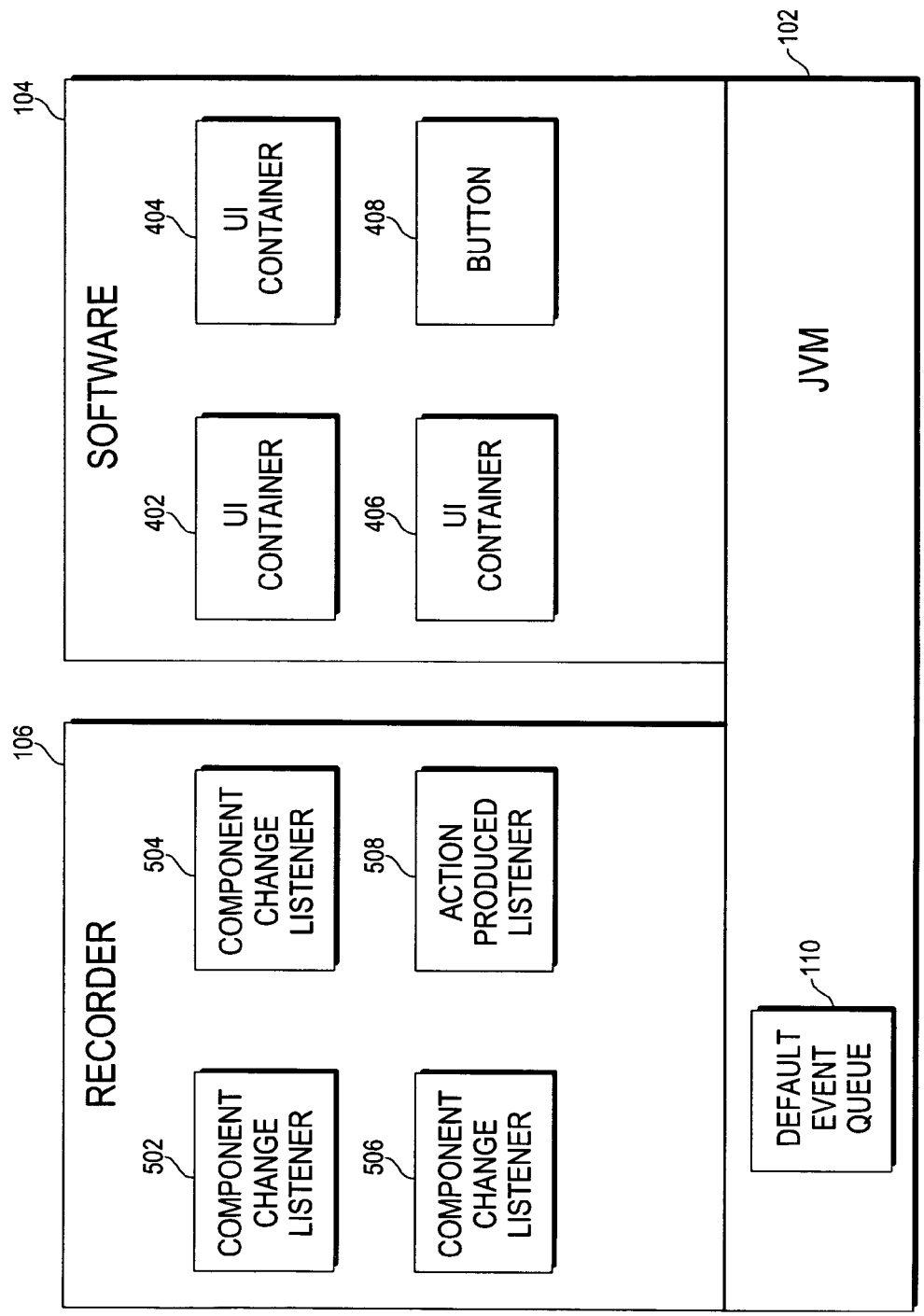
FIG. 5 shows the functional components, including UI components and listeners, corresponding to the UI shown in FIG. 4, in accordance with one embodiment of the present invention.

To illustrate how this can be done, reference will be made to the example shown in FIG. 4. Specifically, suppose that when the recorder 106 is activated, the software 104 has the UI components 402, 404, 406, and 408 running. For the sake of discussion, it will be assumed that these are the only UI components currently running in the software 104. Suppose further that the component hierarchy is as shown in FIG. 4, where the button 408 is contained within UI container 406, which is contained within UI container 404, and which is contained within UI container 402.

To ascertain the existence of these UI components 402-408, the recorder 106 submits one or more queries to the JVM 102. In response, the JVM 102 provides to the recorder 106 a reference to each of the UI components 402-408. The recorder 106 then uses these references to interact with the various UI components 402-408. Specifically, using the reference to UI container 402, the recorder 106 interacts with UI container 402 to determine whether it is a container or a UI control. Upon learning that it is a container, the recorder 106 starts up a component change listener, and registers it with UI container 402. This component change register will thereafter be notified by the UI container 402 if any UI containers are opened or closed within UI container 402. The recorder 106 repeats the same process with UI containers 404 and 406. By the end of the process, a component change listener will have been started and registered with each of the UI containers 404, 406. The recorder 106 then interacts with button 408. Upon learning that it is a UI control component, the recorder 106 proceeds to further interact with the button 408 to determine its component type. Upon learning that the button 408 is of type button, the recorder 106 starts up an action produced listener (see above table), and registers that listener with the button 408. The action produced listener will thereafter be notified by the button 408 if any events (e.g. pushing or releasing of the button) occur on the button 408. The recorder 106 is now fully registered with the UI components 402-408 of the software 104, and is ready to record high level events. By the end of this process, the recorder 106 and the software 104 will have the functional components shown in FIG. 5. Specifically, the recorder 106 has component change listeners 502, 504, 506, and action produced listener 508, and the software 104 has UI containers 402, 404, and 406, and button 408. In this example, listener 502 is registered with container 402, listener 504 is registered with container 404, listener 506 is registered with container 406, and listener 508 is registered with button 408.

Suppose now that the user initiates a left mouse click on the button 408. This low level UI action is passed to the default event queue 110, which in turn, dispatches it to button 408 for processing. Suppose that in processing the UI action, the button 408 determines that it has been pushed. In such a case, the button 408 sends a notification to the action produced listener 508 to inform the listener 508 that the button 408 has been pushed. In one embodiment, this notification includes some event-specific information (e.g. that the button has been pushed), as well as a reference back to the button 408.

In response, the listener 508 proceeds to create and store a record of the event. In creating the record, the listener 508 first determines a component hierarchy, if any, in which the button 408 is contained. In one embodiment, the listener 508 does so by initially asking the button 408 for a reference to its parent container, if any. In this example, the button 408 responds with a reference to container 406. Using this reference, the listener 508 then asks container 406 for a reference to its parent container, if any. In this example, the container 406 responds with a reference to container 404. Using this reference, the listener 508 then asks container 404 for a reference to its parent container, if any. In this example, the container 404 responds with a reference to container 402. Finally, using this reference, the listener 508 asks container 402 for a reference to its parent container, if any. This time, there is no parent container; thus, container 402 responds with no reference. The listener 508 now knows that it has reached the top of the component hierarchy, and hence, that it has found all of the ancestors of the button 408.

After the component hierarchy is determined, the listener 508 proceeds to obtain component-specific information for the button 408 and for each of the containers 402-408 in the component hierarchy. In one embodiment, the listener 508 does so by selecting one of the UI components (e.g. the button 408), and querying it for its component type. Once the component type is determined, the listener 508 invokes the plug-in 312 associated with that component type. In invoking the plug-in 312, the listener 508 provides to the plug-in the reference to the selected UI component. In response, the associated plug-in 312 interacts with the selected UI component to obtain component-specific information therefrom. In one embodiment, this information includes but is not limited to the title/name of the selected UI component, the index associated with the selected UI component (there may be more than one instance of the selected UI component in a particular container, and the index specifically identifies the instance that is the selected UI component), and any other information that helps to specifically identify the selected UI component. After the associated plug-in obtains the component-specific information, it provides the information to the listener 508. Thereafter, the listener 508 selects another UI component and repeats the above process. This continues until the listener 508 has obtained component-specific information for the button 408 and for each of the containers 402-406 in the component hierarchy. Once that is done, the listener 408 has all of the information that it needs for the event.

Thereafter, the listener 508 stores a record of the event. In one embodiment, the record may be stored in any desired format, and comprises all of the information needed to apply the event to the button 408 at a later time. The record of the event may include, but is not limited to, event-specific information (e.g. that the button was pushed), component-specific information for the button 408, component-specific information for each of the containers 402-406 in the component hierarchy, information indicating the hierarchical relationship between the UI components 402-408, information indicating that button 408 is the target of the event, etc. The record may be stored in a centralized data structure (e.g. a common file, a centralized database, etc.) to facilitate subsequent access. The event is thus captured.

Suppose now that the user causes container 404 to be closed. When this happens, the listener 502 registered with container 402 is notified. In response, listener 502 determines which listeners are registered with the components that are being closed, and causes those listeners to be shut down to conserve resources. In this example, closing container 404 will cause container 406 and button 408 to also close. Thus, listener 502 causes listeners 504, 506, and 508 to shut down.

Figure 6:
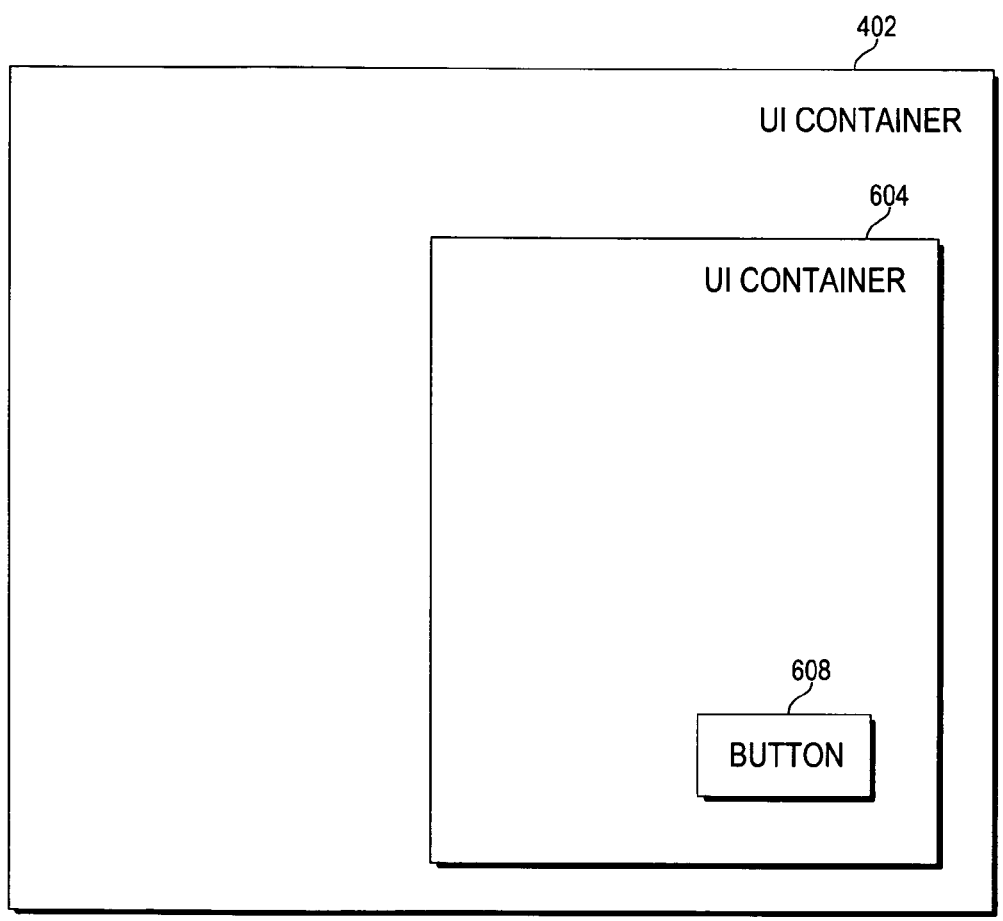
FIG. 6 shows the UI of FIG. 4, after one of the containers has been closed and another container has been opened.

Suppose further that the user causes a new UI container 604 to be opened within container 402, as shown in FIG. 6, and that the new container 604 contains another button 608. When this occurs, the listener 502 registered with container 402 is once again notified. In response, the listener 502 determines whether the component being opened is a container or a UI control. Upon learning that container 604 is a container, the listener 502 starts a component change listener and registers it with the container 604. In addition, the listener 502 determines whether the new container 604 contains any UI controls. In this example, container 604 contains button 608. Accordingly, listener 502 determines the type of the UI control (in this case, button), and starts and registers one or more appropriate listeners with the UI control. In this example, the listener 502 starts an action produced listener and registers it with the button 608. The listener is now ready to record events on the button 608. In the manner described, through the use of component change listeners, the recorder 106 is able to dynamically track and adapt to the opening and closing of UI components in the software 104.

Post Recording Processing

In the manner described above, the recorder 106 records high level events on various UI components 108 of the software 104. This recording continues until the user deactivates the recording function of the recorder 106. In one embodiment, when that happens, the recorder 106 un-registers all listeners from their respective UI components 108 and shuts down the listeners.

Formatting

At some point after the events are recorded, the user may wish to store the event records in a standard structured, self-describing format, such as XML. To do so, the user invokes the XML generator 310 of the recorder 106. When invoked, the XML generator 310 takes the event records stored by the various listeners, and formats them into XML. To show how this may be done, reference will be made to the example shown in FIG. 4, and the sample XML shown in FIG. 7.

As discussed previously, FIG. 4 shows the example where a button 408 is pushed. This button 408 is contained within a UI container 406, which in turn is contained within UI container 404, which in turn is contained within UI container 402. FIG. 7 shows some sample XML for capturing this event.

The event is captured within a set of record tags 702 and a set of action tags 704. The specifics of the event are captured within the action tags 704 with a plurality of comp (or component) tags 706 and an event tag 708. In one embodiment, each comp tag 706 contains component-specific information pertaining to a particular UI component, and the comp tags 706 are ordered in such a way that they set forth the component hierarchy.

In this example, the first comp tag 706(1) contains information for UI container 402, which is at the top of the hierarchy. In the example shown, comp tag 706(1) includes the component type, title (i.e. name), and index for container 402. Comp tag 706(1) also specifies that target=0, which indicates that container 402 is not the final target of the event. Thus, it follows that container 402 has a child UI component.

Comp tag 706(2) follows comp tag 706(1) and contains the component-specific information for container 404, which is a child of container 402. Comp tag 706(2) includes the component type, title, and index for container 404. Comp tag 706(2) also specifies that target=0; thus, it is known that container 404 is not the target of the event, and that it has a child component.

Comp tag 706(3) follows comp tag 706(2) and contains the component-specific information for container 406, which is a child of container 404. Comp tag 706(3) includes the component type, title, and index for container 406. Comp tag 706(3) also specifies that target=0; thus, it is again known that container 406 is not the target of the event, and that it has a child component.

Finally, comp tag 706(4) follows comp tag 706(3) and contains the component-specific information for button 408, which is a child of container 406. Comp tag 706(4) includes the component type, title, and index for button 408. Unlike the other comp tags, however, comp tag 706(4) specifies that target=1; thus, button 408 is indicated as the target of the event.

In addition to the component-specific information discussed above, some event-specific information is also specified. In the example shown, this is done using the event tag 708. In the current example, the event is a push of the button 408. Thus, event tag 708 indicates that the event id is button push. In the manner described, an event may be captured in XML format.

Code Generation

After the event records are formatted into XML, they can be used in various ways. One use of the XML version of the event records is to process them through a code generator to automatically generate a set of computer code that makes up a test program. In one embodiment, this computer code takes the form of Java source code; however, it should be noted that it could take on other forms as well (e.g. C or C++ code). The generation of computer code from XML is well known in the art and need not be described in detail herein. Once generated, the test program may be executed in conjunction with the software 104 or another build of the software 104 to cause the recorded events to be applied to the appropriate target UI components of the software 104. As an alternative to code generation, the XML may be interpreted by an XML interpreter. Upon interpreting the XML, the interpreter causes the recorded events to be applied to the appropriate target UI components of the software 104. Either way, manipulating/testing of the software 104 is automated.

Automatic Testing

Figure 8A:
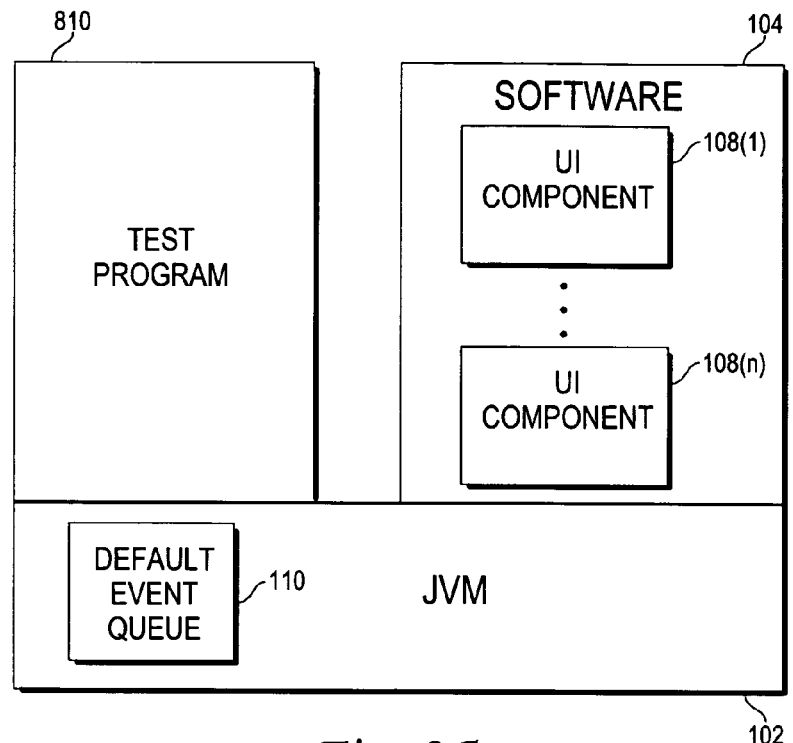
FIGS. 8A-8B show two possible environments in which a set of software is automatically tested.
Figure 8B:
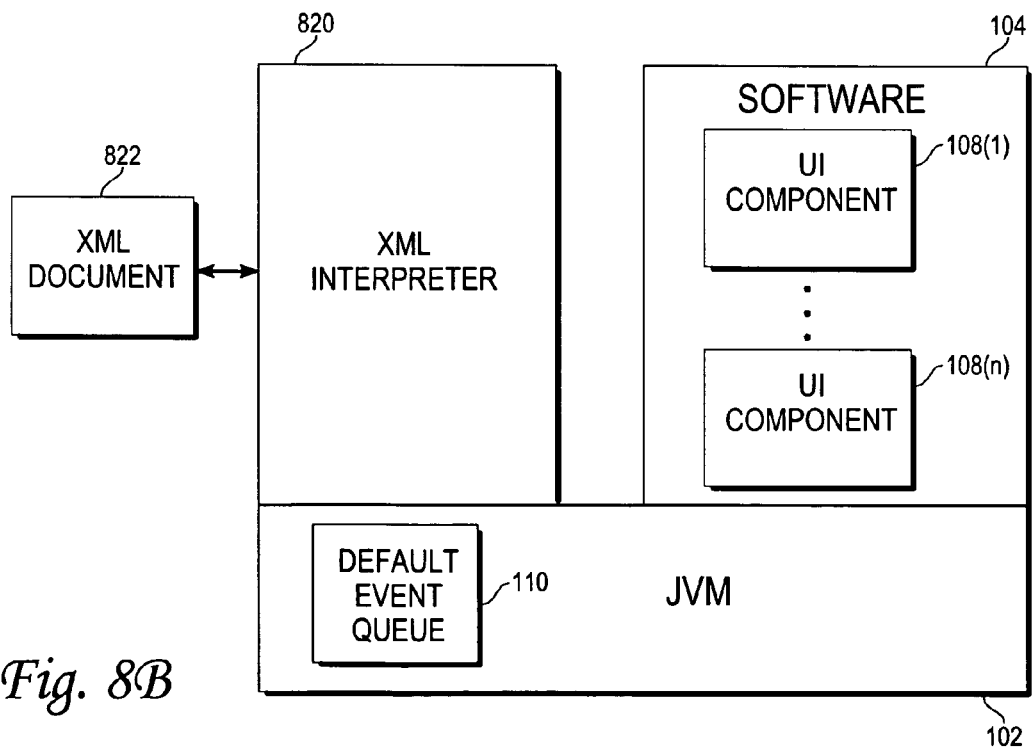

FIGS. 8A and 8B show functional block diagrams of two possible environments in which the software 104 is automatically manipulated/tested. FIG. 8A shows the environment where a test program 810, which has been automatically generated from the XML version of the event records, is executed in conjunction with the software 104 on different threads of the same JVM 102. FIG. 8B shows the environment in which the XML version 822 of the event records is interpreted by an XML interpreter 820, which in turn is executed in conjunction with the software 104 on different threads of the same JVM 102. In either environment, events are sent to the default event queue 110 to simulate user actions. In FIG. 8A, it is the test program 810 that sends the events to the default event queue 110. In FIG. 8b, it is the interpreter 820 that sends the events to the default event queue 110. When an event is sent to the default event queue 110, enough information is provided to the default event queue 110 with regard to the component hierarchy and the target UI component that the default event queue 110 is able to determine exactly which UI component 108 is the target of the event. Thus, the default event queue 110 is able to dispatch the event to the proper target UI component 108 of the software 104. In this manner, manipulation/testing of the software 104 is automated.

Hardware Overview

Figure 9:
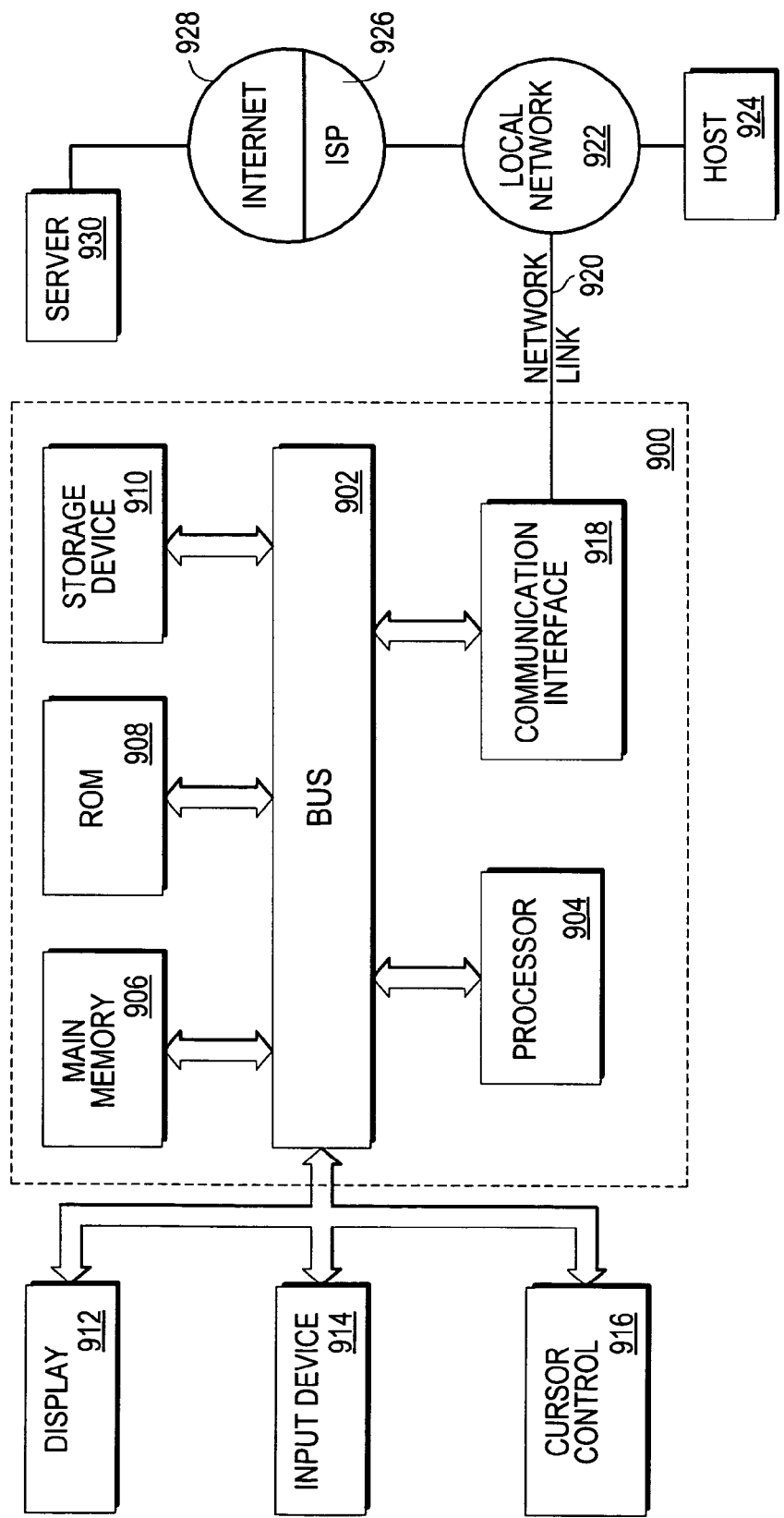
FIG. 9 is a block diagram of a general purpose computer system in which one embodiment of the present invention may be implemented.

FIG. 9 is a block diagram that illustrates a computer system 900 upon which an embodiment of the invention may be implemented. Computer system 900 includes a bus 902 for facilitating information exchange, and one or more processors 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions by processor 904. Computer system 900 may further include a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

In computer system 900, bus 902 may be any mechanism and/or medium that enables information, signals, data, etc., to be exchanged between the various components. For example, bus 902 may be a set of conductors that carries electrical signals. Bus 902 may also be a wireless medium (e.g. air) that carries wireless signals between one or more of the components. Bus 902 may also be a medium (e.g. air) that enables signals to be capacitively exchanged between one or more of the components. Bus 902 may further be a network connection that connects one or more of the components. Overall, any mechanism and/or medium that enables information, signals, data, etc., to be exchanged between the various components may be used as bus 902.

Bus 902 may also be a combination of these mechanisms/media. For example, processor 904 may communicate with storage device 910 wirelessly. In such a case, the bus 902, from the standpoint of processor 904 and storage device 910, would be a wireless medium, such as air. Further, processor 904 may communicate with ROM 908 capacitively. In this instance, the bus 902 would be the medium (such as air) that enables this capacitive communication to take place. Further, processor 904 may communicate with main memory 906 via a network connection. In this case, the bus 902 would be the network connection. Further, processor 904 may communicate with display 912 via a set of conductors. In this instance, the bus 902 would be the set of conductors. Thus, depending upon how the various components communicate with each other, bus 902 may take on different forms. Bus 902, as shown in FIG. 9, functionally represents all of the mechanisms and/or media that enable information, signals, data, etc., to be exchanged between the various components.

The invention is related to the use of computer system 900 for implementing the techniques described herein. According to one embodiment of the invention, those techniques are performed by computer system 900 in response to processor 904 executing one or more sequences of one or more instructions contained in main memory 906. Such instructions may be read into main memory 906 from another machine-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 900, various machine-readable media are involved, for example, in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution. In this manner, computer system 900 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. For example, rather than formatting the event records into XML and then generating the test program code from the XML, it is possible to generate the test program code directly from the event records. This and other modifications are possible. Thus, the invention should not be limited by the specific embodiments used to illustrate it but only by the scope of the issued claims and the equivalents thereof.

What is claimed is:

1. A machine-implemented method, comprising:
   registering with a first user interface (UI) component to receive a notification when an event occurs on the first UI component;
   receiving the notification from the first UI component when the event occurs on the first UI component, wherein the notification comprises event-specific information;
   determining a component hierarchy using the first UI component, wherein the component hierarchy comprises the first UI component and a plurality of other UI components, wherein each one of the plurality of other UI components comprises the first UI component, and wherein the first UI component is directly related to at least one UI component in the plurality of other UI components;
   creating a record of the event using the component hierarchy,
      wherein the record comprises at least a portion of the event-specific information, information indicating the first UI component as a target of the event, and component-specific information for each of the UI components in the component hierarchy,
      wherein the component-specific information for a UI component in the component hierarchy is obtained from the UI component, and wherein obtaining the component-specific information for the first UI component comprises determining a component type for the first UI component determining a plug-in module associated with the component type and invoking the plug-in module to obtain the component-specific information for the first UI component from the first UI component; and
   storing the record in a manner that enables the record to be subsequently accessed.

2. The method of claim 1, further comprising:
   generating computer code based upon the record, the computer code, when executed, causing the event to be applied to the first UI component.

3. The method of claim 1, further comprising:
   formatting information in the record into a structured, self-describing format to give rise to a formatted version of the record.

4. The method of claim 3, further comprising:
   generating computer code based upon the formatted version of the record, the computer code, when executed, causing the event to be applied to the first UI component.

5. The method of claim 3, further comprising:
   interpreting the formatted version of the record to cause the event to be applied to the first UI component.

6. The method of claim 3, wherein the structured, self-describing format is XML (extensible markup language).

7. The method of claim 1, wherein determining the component hierarchy comprises:
   determining all ancestor UI container components of the first UI component.

8. The method of claim 1, wherein registering with the first UI component comprises:

registering a listener module with the first UI component to receive the notification from the first UI component when the event occurs on the first UI component.

9. The method of claim 8, wherein registering the listener module comprises:

determining a component type for the first UI component;

determining that a listener module associated with the component type; and registering the listener module with the first UI component.

10. A machine-implemented method, comprising:

registering with a first UI container to receive notification whenever a UI container is opened or closed within the first UI container;

receiving notification from the first UI container that a second UI container has been opened within the first UI container, wherein the second UI container contains a UI component;

registering a first listener module with the second UI container to receive notification whenever a UI container is opened or closed within the second UI container;

registering a second listener module with the UI component to receive notification from the UI component when the event occurs on the UI component;

receiving notification from the first UI container that the second UI container has been closed; and shutting down the first and second listener modules.

11. The method of claim 10, further comprising:

receiving notification from the first UI container that the second UI container has been closed; and shutting down the first listener module.

12. A machine-readable storage medium, comprising:

instructions for causing one or more processors to register with a first user interface (UI) component to receive a notification when an event occurs on the first UI component;

instructions for causing one or more processors to receive the notification from the first UI component when the event occurs on the first UI component, wherein the notification comprises event-specific information;

instructions for causing one or more processors to determine a component hierarchy using the first UI component, wherein the component hierarchy comprises the first UI component and a plurality of other UI components, wherein each one of the plurality of other UI components comprises the first UI component, and wherein the first UI component is directly related to at least one UI component in the plurality of other UI components;

instructions for causing one or more processors to create a record of the event, wherein the record comprises at least a portion of the event-specific information, information indicating the first UI component as a target of the event, and component-specific information for each of the UI components in the component hierarchy, wherein the component-specific information for a UI component in the component hierarchy is obtained from the UI component, and wherein obtaining the component-specific information for the first UI component comprises determining a component type for the first UI component determining a plug-in module associated with the component type, and invoking the plug-in module to obtain the component-specific information for the first UI component from the first UI component; and instructions for causing one or more processors to store the record in a manner that enables the record to be subsequently accessed.

13. The machine-readable storage medium of claim 12, further comprising:

instructions for causing one or more processors to generate computer code based upon the record, the computer code, when executed, causing the event to be applied to the first UI component.

14. The machine-readable storage medium of claim 12, further comprising:

instructions for causing one or more processors to format information in the record into a structured, self-describing format to give rise to a formatted version of the record.

15. The machine-readable storage medium of claim 14, further comprising:

instructions for causing one or more processors to generate computer code based upon the formatted version of the record, the computer code, when executed, causing the event to be applied to the first UI component.

16. The machine-readable storage medium of claim 14, further comprising:

instructions for causing one or more processors to interpret the formatted version of the record to cause the event to be applied to the first UI component.

17. The machine-readable storage medium of claim 14, wherein the structured, self-describing format is XML (extensible markup language).

18. The machine-readable storage medium of claim 12, wherein the instructions for causing one or more processors to determine the component hierarchy comprises:

instructions for causing one or more processors to determine all ancestor UI container components of the UI component.

19. The machine-readable storage medium of claim 18, wherein the record of the event comprises the component-specific information for the first UI component and the component-specific information for each of the ancestor UI container components.

20. The machine-readable storage medium of claim 12, wherein the instructions for causing one or more processors to register with the first UI component comprises:

instructions for causing one or more processors to register a listener module with the first UI component to receive the notification from the first UI component when an event occurs on the first UI component.

21. The machine-readable storage medium of claim 20, wherein the instructions for causing one or more processors to register the listener module comprises:

instructions for causing one or more processors to determine a component type for the first UI component;

instructions for causing one or more processors to determine a listener module associated with the component type; and instructions for causing one or more processors to register the listener module with the first UI component.

22. A machine-implemented machine-readable storage medium, comprising:

instructions for causing one or more processors to register with a first UI container to receive notification whenever a UI container is opened or closed within the first UI container;

instructions for causing one or more processors to receive notification from the first UI container that a second UI container has been opened within the first UI container, wherein the second UI container contains a UI component;

instructions for causing one or more processors to register a first listener module with the second UI container to receive notification whenever a UI container is opened or closed within the second UI containers instructions for registering a second listener module with the UI component to receive notification from the UI component when an event occurs on the UI component;

instructions for receiving notification from the first UI container that the second UI container has been closed; and instructions for shutting down the first and second listener modules.

23. The machine-readable storage medium of claim 22, further comprising:

instructions for causing one or more processors to receive notification from the first UI container that the second UI container has been closed; and instructions for causing one or more processors to shut down the first listener module.

* * * * *

UNITED STATES PATENT AND TRADEMARK OFFICE
CERTIFICATE OF CORRECTION

| | | |
|---|---|---|
| PATENT NO. | : 7,653,721 B1 | Page 1 of 1 |
| APPLICATION NO. | : 10/983324 | |
| DATED | : January 26, 2010 | |
| INVENTOR(S) | : Romanov et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1488 days.

Signed and Sealed this

Twenty-third Day of November, 2010

David J. Kappos
*Director of the United States Patent and Trademark Office*